(12) United States Patent
Ito (10) Patent No.: US 7,133,157 B2
(45) Date of Patent: Nov. 7, 2006

(54) IMAGE PROCESSING METHOD AND APPARATUS

(75) Inventor: Tsukasa Ito, Hino (JP)

(73) Assignee: Konica Corporation (JP)

( * ) Notice: Subject to any disclaimer, the term of this patent is extended or adjusted under 35 U.S.C. 154(b) by 988 days.

(21) Appl. No.: 10/231,564

(22) Filed: Aug. 29, 2002

(65) Prior Publication Data

US 2003/0053159 A1    Mar. 20, 2003

(30) Foreign Application Priority Data

Sep. 6, 2001    (JP)    ............... 2001-269970

(51) Int. Cl.
  *H04N 1/48*    (2006.01)
  *H04N 1/56*    (2006.01)
  *H04N 1/58*    (2006.01)
(52) U.S. Cl. .................... 358/1.9; 358/3.26; 358/3.27; 358/532
(58) Field of Classification Search ............... 358/1.9, 358/3.26, 3.27, 515, 530, 532, 521; 382/162, 382/167, 260–264, 266, 274–275; 348/606–607, 348/612, 625, 630
See application file for complete search history.

(56) References Cited

U.S. PATENT DOCUMENTS

| | | | |
|---|---|---|---|
| 4,812,903 A * | 3/1989 | Wagensonner et al. | 358/521 |
| 6,259,537 B1 * | 7/2001 | Matama | 358/1.9 |
| 6,480,300 B1 * | 11/2002 | Aoyama | 358/1.9 |
| 6,603,878 B1 * | 8/2003 | Takemoto | 382/167 |
| 2004/0190023 A1 * | 9/2004 | Aoyama | 358/1.9 |

FOREIGN PATENT DOCUMENTS

| | | |
|---|---|---|
| JP | 63-26783 | 2/1988 |
| JP | 9-22460 | 1/1997 |
| JP | 2000-215307 | 8/2000 |

* cited by examiner

*Primary Examiner*—Scott A. Rogers
(74) *Attorney, Agent, or Firm*—Cantor Colburn LLP (57) ABSTRACT

An image processing method for obtaining processed color image signals from image signals on a silver halide photosensitive material, having the following steps: transforming color image signals into a luminance signal and color information signals; applying a high-frequency component suppression processing to the color information signals; decomposing the luminance signal into a luminance low-frequency component signal, a luminance medium-frequency component signal, and a luminance high-frequency component signal; applying a processing, in accordance with requirement, to the luminance low-frequency component signal; applying a suppression processing to the luminance medium-frequency component signal; applying an emphasis processing to the luminance high-frequency component signal; composing a processed luminance signal through combining the processed luminance low-frequency component, the processed luminance medium-frequency component signal, and the processed luminance high-frequency component signal; and transforming the processed luminance signal and the processed color information signals into a set of processed color image signals.

24 Claims, 6 Drawing Sheets

IMAGE PROCESSING METHOD AND APPARATUS

BACKGROUND OF THE INVENTION

This invention relates to an image processing method to be applied to an image formed by scanning a color photograph to make it a set of color image signals based on a silver halide photosensitive material and an image processing apparatus which is suitable to the use in the practice of said processing method, and in particular, to an image processing method and apparatus requiring a small amount of calculation work and being capable of suppressing a granular noise signal contained in the color image signals and emphasizing the sharpness of the image, while preserving the shade in the periphery of the bridge of the nose and the shade around the eyes, without producing a noise looking like a color deviation (deviation of colors due to a registration error in a color print, hereinafter referred to as a color deviation simply) and a smooth blank makeup face, or without generating a noise looking as if fine powders are scattered.

It is put in practice that an image formed on a color photographic film is photoelectrically read by a CCD image sensor or the like, and transformed into a set of color image signals. Such color image signals, after being subjected to various kinds of image processing typically represented by negative-to-positive reversing, luminance adjustment, color balance adjustment, granular noise removal, and sharpness emphasis, are transmitted through a recording medium such as a CD-R, a floppy disk, or a memory card, or an Internet line, and are outputted as a hard-copy image by a silver halide photographic paper, an ink jet printer, a thermal printer, or the like, or displayed on a recording medium such as a CRT, a liquid crystal display, or a plasma display, to be appreciated.

Generally speaking, a color photographic image is formed by a congregation of dye-clouds of various sizes. Therefore, if the image is observed by enlarging it, it is found that mottled granular unevenness based on the dye-clouds are present in areas which should have a uniform tone originally. Caused by this, in a color image signal which is obtained by photoelectrically reading an image formed on a photographic film by a CCD image sensor or the like, a noise signal corresponding to the unevenness is contained. It has posed the problem that this noise signal became remarkably large accompanied especially by image processing for emphasizing sharpness, which degraded the quality of the image.

As regards a method of removing a noise contained in an image signal, a smoothing method and a method using a median filter are widely known (for example, 'S. Inoue et al, "Learning practical image processing using C language (written in Japanese)", p. 54, published by Ohm Co., Ltd.').

In U.S. Pat. No. 4,812,903, it is proposed a technology for emphasizing sharpness while suppressing granularity through it that a set of color image signals are transformed into a luminance signal and color information signals, the luminance signal is further decomposed into a low-frequency component and a high-frequency component, non-linear processing is applied to said low-frequency component of the luminance signal, an emphasis processing is applied to said high-frequency component of the luminance signal, and an adjustment processing is separately applied to said color information signals; after that, the low-frequency component of the luminance signal, the high-frequency component of the luminance signal, and the color information signal, which have been processed, are combined to give a set of processed color image signal.

Further, in the publication of the unexamined Japanese patent application S63-26783, it is proposed a technology for obtaining a natural emphasis processing with a small change of color tone through it that a set of inputted color image signals are transformed into a luminance signal and color information signals, spatial general information is abstracted by applying an averaging filter processing to said luminance signal, spatial detailed information is calculated from the difference between said luminance signal and said spatial general information, and a specified transformation processing is applied to each of said spatial detailed information and said spatial general information; after that, the spatial detailed information, the spatial general information, and said color information signals, which have been already processed, are combined to give a set of processed color image signals.

In the publication of the unexamined Japanese patent application H9-22460, it is proposed a technology for emphasizing sharpness while suppressing granularity through it that an inputted image signal is decomposed into a low-frequency component, a medium-frequency component, and a high-frequency component, an emphasis processing is applied to said high-frequency component, while suppression processing being applied to said medium-frequency component, and the processed high-frequency component, the processed medium-frequency component, and the low-frequency component are combined to give a processed image signal. Further, also it is proposed in the same publication a technology for suppressing the roughening of color through abstracting a luminance component from the aforesaid high-frequency component and medium-frequency component in process of the above-mentioned processing, and practicing the above-mentioned emphasis suppression processing on the basis of said luminance component only and composition.

In the publication of the unexamined Japanese patent application 2000-215307, it is proposed a technology for suppressing the roughening resulting from granularity and enhancing sharpness through it that a set of inputted color image signals of R, G, and B are decomposed into a low-frequency component, a medium-frequency component, and a high-frequency component, it is obtained a correlation value with respect to corresponding pixels between at least one color set composed of two colors out of the above-mentioned three colors R, G, and B of said medium-frequency component and/or said high-frequency component, a granularity detecting processing using a specified morphology operation is applied to the above-mentioned R, G, and B signals, and an emphasis processing is applied to said high-frequency component, while a suppression processing is applied to said medium-frequency component on the basis of evaluation values composed of the above-mentioned correlation value and the result of the granularity detecting processing using the above-mentioned morphology operation; then, the above-mentioned high-frequency component after the emphasis processing, the above-mentioned medium-frequency component after the suppression processing, and the above-mentioned low-frequency component are combined to compose a signal. Further, also it is proposed in said publication a technology such that, prior to the above-mentioned emphasis processing to the high-frequency component, from the aforesaid medium-frequency component and the aforesaid high-frequency component, a luminance signal concerning said medium-frequency component and a luminance signal concerning said high-frequency component are abstracted respectively, and the aforesaid emphasis processing to the high-frequency component is an emphasis processing to the luminance signal concerning the aforesaid high-frequency component, while the aforesaid suppression processing to the medium-frequency component is a suppression processing to the luminance signal concerning the aforesaid medium-frequency component.

However, because the noise removal by means of a simple filter processing which is widely known is accompanied by the lowering of image sharpness, a satisfactory image cannot be obtained. In a technology disclosed in U.S. Pat. No. 4,812,903 or in a technology disclosed in the publication of the unexamined Japanese patent application S63-26783, although some effect can be recognized in the suppression of granular noise being made worse in a sharpness emphasizing process can be recognized, it is not sufficient, and it cannot be expected to suppress a granular noise for a signal before the processing.

The method disclosed in the publication of the unexamined Japanese patent application H9-22460 has an effect to eliminate granular unevenness looking mottled in an image by selectively suppressing a medium-frequency component in which a granular noise is mainly present, but because the information on the image structure which is present in the medium-frequency component is suppressed at the same time, for example, the shade in the periphery of the bridge of the nose and that around the eyes tend to be suppressed to give an impression of blurred image of the face. If the high-frequency component is remarkably emphasized for compensating this feeling of blur, the image becomes unsightly due to the generation of fine noises looking like color deviations in the flat areas such as the cheek.

According to the method proposed also in the publication of the unexamined Japanese patent application H9-22460 in which emphasis suppression processing and combining are practiced on the basis of the luminance component of medium and high frequencies only, the noise looking like a deviation is not generated, but a subtle variation in a reddish color of the skin etc. are also suppressed, which gives an impression of smooth blank makeup face.

Further, in any one of the examples of the embodiment described in the publication of the unexamined Japanese patent application H9-22460, if it is attempted to enhance the sharpness in fine areas like hairs, the high-frequency component is excessively emphasized, and it is generated a noise looking as if fine powders are scattered over the whole image area.

Further, there is another problem that, in order to separate a low-frequency component from an image signal as intended in the publication of the unexamined Japanese patent application H9-22460, it is necessary to apply a processing with a very large-sized low-pass filter to every channel of the color signal representing the original image (for example, each of the signal channels of B, G, and R), which makes the load of calculation for the image processing very heavy; this is also a very big problem.

The method proposed in the publication of the unexamined Japanese patent application 2000-215307 eases somewhat the above-mentioned defect by dynamically controlling the degree of the suppression of the medium-frequency component and the degree of the emphasis of the high-frequency component in accordance with the situation, but it cannot be said that it is sufficient, and it follows the method which has the point of problem in the image quality as it is. From the viewpoint of the amount of calculation, it is needless to say that this method has a heavier load than that proposed in the publication of the unexamined Japanese patent application H9-22460.

On the basis of the above-mentioned situation, it is an object of this invention to provide an image processing method and apparatus requiring a small amount of calculation work and being capable of suppressing a granularity noise signal contained in an color image signal and emphasizing the sharpness of the image at the same time, while preserving the shade in the periphery of the bridge of the nose and the shade around the eyes, without producing a noise looking like a color deviation and a smooth blank makeup face, or without producing a noise looking as if fine powders are scattered.

SUMMARY OF THE INVENTION

The object of this invention can be accomplished by any one of the structures described below.

1. An image processing method characterized by it that a set of processed color image signals are obtained through the steps of transforming a set of color image signals representing an original image based on a silver halide photosensitive material into a luminance signal and color information signals, producing processed color information signals by applying a high-frequency component suppression processing to said color information signals, decomposing said luminance signal into signals of a luminance low-frequency component, a luminance medium-frequency frequency component, and a luminance high-frequency component, making a processed luminance low-frequency component signal out of said luminance low-frequency component signal by applying a processing to it in accordance with requirement, making a processed luminance medium-frequency component signal out of said luminance medium-frequency component signal by applying a suppression processing to it, making a processed luminance high-frequency component signal out of said luminance high-frequency component signal by applying an emphasis processing to it, composing a processed luminance signal through combining said processed luminance low-frequency component, said processed luminance medium-frequency component signal, and said processed luminance high-frequency component signal, and transforming said processed luminance signal and said processed color information signals into a set of processed color image signals.

2. An image processing method as set forth in the above-mentioned 1, characterized by it that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

3. An image processing method as set forth in the above-mentioned 1 or 2, characterized by it that the processing applied in accordance with requirement to the aforesaid luminance low-frequency component signal is gradation adjustment.

4. An image processing method characterized by it that a set of processed color image signals are obtained through the steps of transforming a set of color image signals representing an original image based on a silver halide photosensitive material into a luminance signal and color information signals, producing processed color information signals by applying a high-frequency component suppressing processing to said color information signals, decomposing said luminance signal into signals of a luminance low-frequency component, a luminance medium-frequency component, and a luminance high-frequency component, and abstracting a luminance edge component signal out of said luminance signal, making a processed luminance low-frequency component signal out of said luminance low-frequency component signal by applying a processing to it in accordance with requirement, making a processed luminance edge component signal out of said luminance edge component signal by applying an emphasis processing to it, making a processed luminance medium-frequency component signal out of said luminance medium-frequency component signal by applying a suppression processing to it, making a processed luminance high-frequency component signal out of said luminance high-frequency component signal by applying an emphasis processing to it, composing a processed luminance signal through combining said processed luminance low-frequency component, said processed luminance edge component signal, said processed luminance medium-frequency component signal, and said processed luminance high-frequency component signal, and transforming said processed luminance signal and said processed color information signals into a set of processed color image signals.

5. An image processing method as set forth in the above-mentioned 4, characterized by it that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

6. An image processing method as set forth in the above-mentioned 4 or 5 characterized by it that the aforesaid luminance edge component signal is obtained from the difference between a signal obtained by applying a median filter processing to the aforesaid luminance signal and a signal obtained by applying a low-pass filter processing to the aforesaid luminance signal.

7. An image processing method as set forth in the above-mentioned 4, 5, or 6, characterized by it that the processing applied in accordance with requirement to the aforesaid luminance low-frequency component signal is a gradation adjustment processing.

8. An image processing method characterized by it that a set of processed color image signals are obtained through the steps of transforming a set of color image signals representing an original image based on a silver halide photosensitive material into a luminance signal and color information signals, producing processed color information signals by applying a high-frequency component suppressing processing to said color information signals, decomposing said luminance signal into signals of a luminance low-frequency component, a luminance medium-frequency component, a luminance high-frequency component, and a luminance superhigh-frequency component, and abstracting a luminance edge component signal out of said luminance signal, making a processed luminance low-frequency component signal out of said luminance low-frequency component signal by applying a processing to it in accordance with requirement, making a processed luminance edge component signal out of said luminance edge component signal by applying an emphasis processing to it, making a processed luminance medium-frequency component signal out of said luminance medium-frequency component signal by applying a suppression processing to it, making a processed luminance high-frequency component signal out of said luminance high-frequency component signal by applying an emphasis processing to it, making a processed luminance superhigh-frequency component signal out of said luminance superhigh-frequency component signal by applying a processing in accordance with requirement to it, composing a processed luminance signal through combining said processed luminance low-frequency component, said processed luminance edge component signal, said processed luminance medium-frequency component signal, said processed high-frequency component signal, and said processed luminance superhigh-frequency component signal, and transforming said processed luminance signal and said processed color information signals into a set of processed color image signals.

9. An image processing method as set forth in the above-mentioned 8, characterized by it that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

10. An image processing method as set forth in the above-mentioned 8, or 9, characterized by it that the processing applied in accordance with requirement to the aforesaid luminance low-frequency component signal is a gradation adjustment processing.

11. An image processing method as set forth in the above-mentioned 8, 9, or 10, characterized by it that the processing applied in accordance with requirement to the aforesaid luminance superhigh-frequency component signal is either a suppression processing or a noise addition processing.

12. An image processing method as set forth in the above-mentioned 9, 10, or 11 characterized by it that the aforesaid luminance edge component signal is obtained from the difference between a signal obtained by applying a median filter processing to the aforesaid luminance signal and a signal obtained by applying a low-pass filter processing to the aforesaid luminance signal.

13. An image processing apparatus characterized by comprising means for transforming a set of color image signals representing an original image based on a silver halide photosensitive material into a luminance signal and color information signals, means for producing a processed color information signals by applying a high-frequency component suppressing processing to said color information signals, means for decomposing said luminance signal into signals of a luminance low-frequency component, a luminance medium-frequency component, and a luminance high-frequency component, signal transforming means for making a processed luminance low-frequency component signal out of said luminance low-frequency component signal by applying a processing in accordance with requirement to it, signal suppressing means for making a processed luminance medium-frequency component signal out of said luminance medium-frequency component signal by applying a suppression processing to it, signal emphasizing means for making a processed luminance high-frequency component signal out of said luminance high-frequency component signal by applying an emphasis processing to it, signal composing means for composing a processed luminance signal through combining said processed luminance low-frequency component signal, said processed luminance medium-frequency component signal, and said processed luminance high-frequency component signal, and signal transforming means for transforming said processed luminance signal and said processed color information signals into a set of processed color image signals.

14. An image processing apparatus as set forth in the above-mentioned 13, characterized by it that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

15. An image processing apparatus as set forth in the above-mentioned 13 or 14, characterized by it that the aforesaid signal transforming means to be applied to the aforesaid luminance low-frequency component signal in accordance with requirement is gradation adjusting means.

16. An image processing apparatus characterized by comprising means for transforming a set of color image signals representing an original image based on a silver halide photosensitive material into a luminance signal and color information signals, signal suppressing means for producing a processed color information signals by applying a high-frequency component suppressing processing to said color information signals, means for decomposing said luminance signal into signals of a luminance low-frequency component, a luminance medium-frequency component, and a luminance high-frequency component, means for abstracting a luminance edge component signal out of said luminance signal, signal transforming means for making a processed luminance low-frequency component signal out of said luminance low-frequency component signal by applying a processing in accordance with requirement to it, signal emphasizing means for making a processed luminance edge component signal out of said luminance edge component signal by applying an emphasis processing to it, signal suppressing means for making a processed luminance medium-frequency component signal out of said luminance medium-frequency component signal by applying a suppression processing to it, signal emphasizing means for making a processed luminance high-frequency component signal out of said luminance high-frequency component signal by applying an emphasis processing to it, signal composing means for composing a processed luminance signal through combining said processed luminance low-frequency component signal, said processed luminance edge component signal, said processed luminance medium-frequency component signal, and said processed luminance high-frequency component signal, and signal transforming means for transforming said processed luminance signal and said processed color information signals into a set of processed color image signals.

17. An image processing apparatus as set forth in the above-mentioned 16, characterized by it that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

18. An image processing apparatus as set forth in the above-mentioned 16, or 17 characterized by it that the aforesaid means for obtaining a luminance edge component signal consists of means for applying a median filter processing to the aforesaid luminance signal, means for applying a low-pass filter processing to the aforesaid luminance signal, and means for obtaining the difference between the signals obtained by the above-mentioned both means.

19. An image processing apparatus as set forth in the above-mentioned 16, 17, or 18, characterized by it that the aforesaid signal transforming means to be applied to the aforesaid luminance low-frequency component signal in accordance with requirement is a gradation adjusting means.

20. An image processing apparatus comprising means for transforming a set of color image signals representing an original image based on a silver halide photosensitive material into a luminance signal and color information signals, means for producing processed color information signals by applying a high-frequency component suppressing processing to said color information signals, means for decomposing said luminance signal into signals of a luminance low-frequency component, a luminance medium-frequency component, a luminance high-frequency component signal, and a luminance superhigh-frequency component, means for abstracting a luminance edge component signal out of said luminance signal, signal transforming means for making a processed luminance low-frequency component signal out of said luminance low-frequency component signal by applying a processing in accordance with requirement to it, signal emphasizing means for making a processed luminance edge component signal out of said luminance edge component signal by applying an emphasis processing to it, signal suppressing means for making a processed luminance medium-frequency component signal out of said luminance medium-frequency component signal by applying a suppression processing to it, signal emphasizing means for making a processed luminance high-frequency component signal out of said luminance high-frequency component signal by applying an emphasis processing to it, signal transforming means for making a processed luminance superhigh-frequency component signal out of said luminance superhigh-frequency component signal by applying a processing in accordance with requirement to it, signal composing means for composing a processed luminance signal through combining said processed luminance low-frequency component signal, said processed luminance edge component signal, said processed luminance medium-frequency component signal, said processed high-frequency component signal, and said processed luminance superhigh-frequency component signal, and signal transforming means for transforming said processed luminance signal and said processed color information signals into a set of processed color image signals.

21. An image processing apparatus as set forth in the above-mentioned 20, characterized by it that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

22. An image processing apparatus as set forth in the above-mentioned 20, or 21, characterized by it that the aforesaid signal transforming means to be applied to the aforesaid luminance low-frequency component signal in accordance with requirement is a gradation adjusting means.

23. An image processing apparatus as set forth in the above-mentioned 20, 21, or 22, characterized by it that the aforesaid signal transforming means to be applied to the aforesaid luminance superhigh-frequency component signal in accordance with requirement is either a suppression means or a noise addition means.

24. An image processing apparatus as set forth in the above-mentioned 20, 21, 22, or 23 characterized by it that the aforesaid means for obtaining a luminance edge component signal consists of means for applying a median filter processing to the aforesaid luminance signal, means for applying a low-pass filter processing to the aforesaid luminance signal, and means for obtaining the difference between the signals obtained by the above-mentioned both means.

BRIEF DESCRIPTION OF THE DRAWINGS

FIG. 1 shows an example of the system blocks of a photographic film reading apparatus having an image processing apparatus of this invention built in;

DETAILED DESCRIPTION OF THE PREFERRED EMBODIMENT

In the following, this invention will be explained in detail.

An image processing method and apparatus according the first invention is characterized by obtaining a processed image signal through the steps of transforming a set of color image signals representing an original image into a luminance signal and color information signals, producing a processed color information signal by applying a high-frequency component suppressing processing to said color information signals, decomposing said luminance signal into signals composed of a luminance low-frequency component, luminance medium-frequency component, and luminance high-frequency component, making a processed luminance low-frequency component signal out of said luminance low-frequency component signal by applying a processing to it in accordance with requirement, making a processed luminance medium-frequency component signal out of said luminance medium-frequency component signal by applying a suppression processing to it, making a processed luminance high-frequency component signal out of said luminance high-frequency component signal by applying an emphasis processing to it, composing a processed luminance signal through combining said processed luminance low-frequency component, said processed luminance medium-frequency component signal, and said processed luminance high-frequency component signal, and transforming said processed luminance signal and said processed color information signals into a set of processed color image signals.

In the above description, an operation to transform a set of color image signals into a luminance signal and color information signals means an operation to transform intensity signals of three colors of, for example, B, G, and R into signals of YIQ basis, HSV basis, YUV basis, or the like known among those who are specialized in the art, signals of XYZ basis in color representation system of CIE 1931 based on the standards such as sRGB or NTSC, signals of L*a*b* basis, L*u*v*, or the like advised by CIE 1976. Even though the transformation into a luminance signal and color information signals in this invention is not perfectly a strict transformation in terms of color science, it exhibits a sufficient effect; therefore, such a transformation, that is described in an example of practice in the publication of the unexamined Japanese patent application S263-26783, as to make a luminance signal out of the average value of B, G, and R signals and to make color information signals out of the signals represented in the axes perpendicular to the axis of the luminance signal is included as an example of the embodiment in this invention.

Further, as regards an operation to decompose a luminance signal or color information signals into several frequency bands, methods of various kinds widely known among those who are specialized in the art, for example, a method in which a signal is decomposed into frequency bands by means of a low-pass filter or a high-pass filter, a method in which a signal is decomposed into frequency bands after Fourier transformation or Wavelet transformation is performed, or the like can be cited. From the viewpoints of load of calculation load and working time for designing, a method in which a signal is decomposed into frequency bands by means of a digital low-pass filter is particularly desirable. The decomposition of a signal into frequency bands by means of a digital low-pass filter will be explained with an example cited.

Generally speaking, a digital filter is expressed by a matrix scan window composed of m lines and n rows, and an image matrix (a matrix composed of image signal values) is scanned through this window sequentially; the sum of the products obtained by multiplying the coefficients in the scan window cell and the corresponding signal values in the image matrix over the whole matrix cells is made the new signal value of the image matrix cell positioned at the center of the scan window matrix. In the case of a low-pass digital filter, it is usually employed a design such that the coefficient at the center of the window is made maximum, and other coefficients surrounding it are gradually made smaller in accordance with the distance from the center. As regards the function for determining the coefficients in accordance with the distance from the center, one that has a good localization characteristic is desirable from the viewpoint of preventing artifact; for example, a Gaussian function described below is often used.

$f(x)=\exp(-x^2/2\sigma^2)$, x: distance from the center.

In the case where a low-pass filter is applied to an image signal, the higher the spatial frequency of a signal component becomes, the larger the amount of attenuation becomes. Generally a frequency corresponding to that at which the amount of attenuation becomes 3 dB is called a cut-off frequency, and it is made the index of the filter characteristic. For example, in the case where the above-mentioned Gaussian function is used in determining the coefficients of a low-pass digital filter, the larger the value of $\sigma$ in the above equation becomes, the lower the cut-off frequency becomes; therefore, by appropriately determining the value of $\sigma$, the cut-off frequency of a filter can be arbitrarily adjusted. Further, because the lower the cut-off frequency of a filter is made, that is, the larger the value of $\sigma$ is made, the smaller the degree of attenuation in accordance with the distance from the center of the coefficients determined by the above equation $f(x)$ becomes, the necessity to make the size of the scan window larger is produced.

Up to now, explanation has been given with a low-pass filter using a Gaussian function taken for instance, but a low-pass filter to be used in this invention should not be limited to this. As a simplest example, there is a method in which the simple mean value of the image signal value of cells in an image matrix over the whole cells in the scan window is made a new signal value of the image matrix cell corresponding to the center of the scan window. In this case too, there is no change in the fact that it is produced the necessity of making the size of the scan window larger in accordance with the cut-off frequency being determined to be lower.

A method of applying the above-mentioned decomposition of a signal into frequency bands by means of a low-pass filter in this invention will be explained in further detail.

If a low-pass filter 1 is applied to a luminance signal after a set of color image signals representing an original image are transformed into a luminance signal and color information signals, a luminance low-frequency component signal which is a signal having its frequency component higher than the cut-off frequency remarkably attenuated is obtained. Further, by taking the difference between the original luminance signal and said luminance low-frequency component signal, a luminance medium-high-frequency component signal with its substantial lower-limit frequency made to be the cut-off frequency of the low-pass filter 1 is obtained. Next, by applying a low-pass filter 2 having a cut-off frequency higher than the above-mentioned low-pass filter 1 to the above-mentioned luminance medium-high-frequency component signal, it is obtained a luminance medium-frequency component signal with its substantial lower-limit frequency made to be the cut-off frequency of the low-pass filter 1 and its substantial upper-limit frequency made to be the cut-off frequency of the low-pass filter 2. Further, by taking the difference between the above-mentioned medium-high-frequency component signal and said luminance medium-frequency component signal, it is obtained a luminance high-frequency component signal with its substantial lower-limit frequency made to be the cut-off frequency of the low-pass filter 2.

According to the above-mentioned procedure, a luminance signal can be decomposed into a luminance low-frequency component signal, a luminance medium-frequency component signal, and a luminance high-frequency component signal. As regards a color information signal, by applying a low-pass filter 3, it can be obtained a processed color information signal which is a signal having its high-frequency component, which has its substantial lower-limit frequency made to be the cut-off frequency of the low-pass filter 3, suppressed. In this case, for the reason to be described later, it is desirable to make the design such one that the lower-limit frequency of the high-frequency component band of the aforesaid high frequency suppression processing to be applied to the color information signals is higher than the lower-limit frequency of the aforesaid luminance medium-frequency component signal, and is lower than the lower-limit frequency of the aforesaid luminance high-frequency component signal.

In this invention, by adjusting the lower-limit frequency of the luminance medium-frequency component signal, the lower-limit frequency of the luminance high-frequency component signal, the degree of suppressing said luminance medium-frequency component signal, and the degree of emphasizing said luminance high-frequency component signal, the impression of graininess and sharpness of the processed image can be adjusted, and by adjusting the lower-limit frequency of the high-frequency band of the color information signals to which suppression processing is applied, a feeling of noise looking like a color deviation can be adjusted.

As regards the luminance low-frequency component signal, for the purpose of controlling impression of graininess and sharpness, and a noise looking like a color deviation, there is no need to particularly adjust the signal; however, in the case where it is necessary to [modulate] transform the gradation tone of the image separately, it is desirable that the [modulation] transformation is applied to the luminance low-frequency component signal calculated in the practice of this invention.

An image processing method and apparatus according to the second invention is characterized by obtaining a set of processed color image signals through the steps of transforming a set of color image signals representing an original image into a luminance signal and color information signals, producing a processed color information signals by applying a high-frequency component suppressing processing to said color information signals, decomposing said luminance signal into signals composed of a luminance low-frequency component, a luminance medium-frequency component, and a luminance high-frequency component, and abstracting a luminance edge component signal out of said luminance signal, making a processed luminance low-frequency component signal out of said luminance low-frequency component signal by applying a processing to it in accordance with requirement, making a processed luminance edge component signal out of said luminance edge component signal by applying an emphasis processing to it, making a processed luminance medium-frequency component signal out of said luminance medium-frequency component signal by applying a suppression processing to it, making a processed luminance high-frequency component signal out of said luminance high-frequency component signal by applying an emphasis processing to it, composing a processed luminance signal through combining said processed luminance low-frequency component, said processed luminance edge component signal, said processed luminance medium-frequency component signal, and said processed luminance high-frequency component signal, and transforming said processed luminance signal and said processed color information signals into a set of processed color image signals.

The abstraction of the luminance edge component in this invention will be explained.

As the image structure forming the signal component of medium-high-frequency in an image signal, in addition to a speckle-shaped fine structure, an edge, that is, an image area near the border portion in the structure of a photographic object exists. Among digital low-pass filters, there is what is called an edge preserving low-pass filter which has a high efficiency of suppressing medium-high-frequency component resulting from the speckle-shaped structure and has a high efficiency of transmitting medium-frequency component resulting from the edge structure, and for a typical example of it, a median filter can be cited. A median filter is expressed by a matrix scan window of m lines and n rows, and an image matrix is scanned through this window sequentially; the median value of the signal values of the image matrix within the range of the scan window is taken as the new signal value of the image matrix cell corresponding to the image matrix cell positioned at the center of the scan window matrix. By varying the size of the scan window of this median filter, it is possible to arbitrarily determine an average cut-off frequency of the medium-high-frequency component resulting from a speckle-shaped structure. However, in the case of a median filter, because the efficiency of transmitting the medium-high-frequency component resulting from an edge structure is high, the medium-frequency component resulting from an edge structure remains left in a frequency range exceeding an average cut-off frequency.

On the other hand, in the case of a low-pass filter employing the above-mentioned Gaussian function, has a characteristic to attenuate equally the frequency component exceeding the cut-off frequency regardless of the origin. Therefore, with a low-pass filter 5 having approximately the same cut-off frequency as an average cut-off frequency of a median filter 4 for the medium-high-frequency component resulting from a speckle-shaped structure prepared, by taking the difference between the signal obtained by applying a processing by the median filter 4 to a luminance signal and the signal obtained by applying a processing by the low-pass filter 5 to the luminance signal, a medium-frequency component resulting from an edge structure, that is, a luminance edge component can be abstracted.

In this invention, it is supposed that the lower-limit frequency of a luminance edge component and that of a luminance medium-frequency component are approximate the same, but there is no need to make the both agree to each other strictly.

An image processing method and apparatus according the third invention is characterized by obtaining a set of processed color image signals through the steps of transforming a set of color image signals representing an original image into a luminance signal and color information signals, producing processed color information signals by applying a high-frequency component suppressing processing to said color information signals, decomposing said luminance signal into signals composed of a luminance low-frequency component, luminance medium-frequency component, luminance high-frequency component, and luminance superhigh-frequency component, and abstracting a luminance edge component signal out of said luminance signal, making a processed luminance low-frequency component signal out of said luminance low-frequency component signal by applying a processing to it in accordance with requirement, making a processed luminance edge component signal out of said luminance edge component signal by applying an emphasis processing to it, making a processed luminance medium-frequency component signal out of said luminance medium-frequency component signal by applying a suppression processing to it, making a processed luminance high-frequency component signal out of said luminance high-frequency component signal by applying an emphasis processing to it, making a processed luminance superhigh-frequency component signal out of said luminance superhigh-frequency component signal by applying a processing in accordance with requirement to it, composing a processed luminance signal through combining said processed luminance low-frequency component, said processed luminance edge component signal, said processed luminance medium-frequency component signal, said processed high-frequency component signal, and said processed luminance superhigh-frequency component signal, and transforming said processed luminance signal and said processed color information signals into a set of processed color image signals.

A luminance superhigh-frequency component signal in this invention means a component signal in a superhigh-frequency band having its lower-limit frequency not lower than 0.9 times the Nyquest frequency of the image signals representing the original image. As regards a superhigh-frequency component signal, it is desirable not to apply an emphasizing operation to it, and it is desirable that whether not to transform the signal or to apply a suppression processing to the signal is selected and practiced on the basis of the resolution and the state of the noise of the set of image signals representing the original image.

As another example of the embodiment, it is also possible to select a method to add a random noise regardless of the intensity of the superhigh-frequency component signal which is originally present. However, in this case, it is necessary that the lower-limit frequency of the random noise to be added is not lower than 0.9 times the Nyquist frequency of the image signals representing the original image.

In this invention, for a silver halide photographic photosensitive material (hereinafter referred to also as a negative film, a film, a photosensitive material, or a sensitive material), a conventional photographic material, in particular, a conventional color negative film (for example, century series films manufactured by Konica Corp.) or a conventional color reversal film can be cited. Further, in this invention, it is also appropriate to use a color negative film which is designed in such a way that it is made more suitable to be read by a film scanner, not based on the premise that it is practiced a photographic print making operation applying projection exposure to a photographic paper by means of an analogue printer as is done in the case of the above-mentioned conventional photographic film. For such a color negative film, for example, one, as described in the publication of the unexamined Japanese patent application 2000-310840, for the purpose of abstracting luminance information and color information of a digital image, having a structure comprising a photosensitive layer for recording luminance information, and desirably further comprising an independent photosensitive layer for recording color information, one, as described in the publication of the unexamined Japanese patent application 2001-224211, having a structure comprising a spectral sensitivity characteristic and sensitivity balance as an imitation of the visual characteristic of human eyes, etc. can be cited.

A set of color image signals representing an original image in this invention are such ones that are obtained by forming an original image by applying development processing to any one of the above-mentioned photosensitive materials, reading the color-separated image information from the visualized dye image information through an image inputting medium (such as a scanner), and converting it into digital image information.

Effect of Invention

In this invention, first transformation of a set of color image signals representing an original image based on a silver halide photographic photosensitive material into a luminance signal and color information signals is practiced, and after that, said luminance signal and said color information signals are decomposed into their respective components; this procedure has an important meaning. That is, in a method of this invention, it is possible, in abstracting the luminance medium-frequency component and color information high-frequency component signal, to determine independently their lower-limit frequencies.

To explain it with a transformation by YIQ basis taken for instance, the separation of the medium-frequency component signal in the Y channel which is the luminance signal means an intention to abstract the luminance component signal in the frequency band which is to be suppressed owing to the high content ratio of a granular noise signal. If the lower-limit frequency of this frequency band is too low, the general density variation of an image is suppressed, which produces what is called a smooth blank picture, and on the contrary, if the lower-limit frequency is too high, the effect of suppressing a granular noise becomes insufficient. Therefore, it is necessary that the lower-limit frequency of a luminance medium-frequency component signal is prudently determined in accordance with the state of granularity of the color film which is used in forming the original image signal and the pixel resolution at the time of digitalization.

In contrast with this, the abstracting of the high-frequency component of the I and Q channels which are the color information signals means to intend abstracting a color information component signal in the frequency band to be suppressed owing to the high content ratio of a noise signal looking like a color deviation in the color information signals. If the lower-limit frequency of this frequency band is too low, for example, subtle variation of reddish color in the human skin is suppressed, which gives an impression of what is called a smooth blank makeup face. On the contrary, if the lower-limit frequency is too high, the effect of suppressing the noise looking like a color deviation becomes insufficient. Hence, also it is necessary that the lower-limit frequency of the color information high-frequency component signals is prudently determined in accordance with the state of the signal composing the original image signals.

As the result of repeated investigations by the inventors of this invention concerning the determination of the lower-limit frequency of the aforesaid luminance medium-frequency component signal and the lower-limit frequency of the aforesaid color information high-frequency component signal, it was found that, in the case where the lower-limit frequency of the high-frequency band of the aforesaid color information signal to which suppression processing was to be applied was higher than that of the aforesaid luminance medium-frequency component signal, and lower than that of the aforesaid luminance high-frequency component signal, the image quality of the image represented by the processed image signals was remarkably improved. Further, also it was found that there was a difference in the optimum determined value between the lower-limit frequency of the high-frequency component of the I channel and that of the Q channel, both channels being the color information signals, and even if the lower-limit frequency of the high-frequency component of the Q channel, to which human eyes have a lower visibility factor, is determined to be higher than the lower-limit frequency of the high-frequency component of the I channel, to which human eyes have a higher visibility factor, a noise looking like a color deviation was hard to be recognized.

Up to now, explanation has been given with YIQ basis taken for instance, the same relationship is effective also in the case where a set of image signals are transformed into signals of HSV basis or YUV basis or in the case where a set of color image signals are transformed into signals of XYZ basis in the calorimetric system of CIE 1931 on the basis of the standard such as sRGB or NTSC. Also in the case where a set of color image signals are transformed into signals of L*a*b* basis or L*u*v* basis of CIE 1976, still it is true that the image quality of the image represented by the processed image signals is remarkably improved so long as the lower-limit frequency of the high-frequency band of the aforesaid color information signals to which a suppression processing is to be applied is higher than that of the aforesaid luminance medium-frequency component signal, and lower than that of the aforesaid luminance high-frequency component signal, but it is desirable to make the lower-limit frequencies of the high-frequency bands to be suppressed in the two channels (a* and b*, or u* and v*) representing the color information equal to each other.

The above-mentioned information has an important meaning from the viewpoint of not only the image quality of the image represented by the processed image signals but also the load of calculation required for the processing. Generally speaking, in the case where a frequency band of an image signal is separated by means of a low-pass filter, if it is intended to determine the upper-limit frequency of the pass band of said low-pass filter at a lower frequency, it is necessary to make the size of one side of the filter larger to that extent, which makes it necessary a calculation giving a heavy load proportional to the squared size of one side of the filter.

In the case where calculation is carried out by a conventional method representatively described in the publications of the unexamined Japanese patent application H9-22460 and 2000-215307, it has been necessary to carry out three times of calculation for the channels of B, G, and R by a large-sized filter which was necessary to stop the pass of a signal having a frequency band corresponding to the lower-limit frequency of the luminance medium-frequency component signal, and the load of calculation has been very heavy.

In contrast with this, according to a method of this invention, the calculation by the corresponding large-sized filter is necessary to the one channel of the luminance signal only, and for the channels I and Q which are the color information signals, calculation time can be shortened by a large margin, because only a calculation by a smaller-sized filter than that for the luminance information is required.

In an image processing method and apparatus according to the first invention, on the basis of the above-mentioned information, it is determined that the lower-limit frequency of the high-frequency component of color information signals to which suppression processing is applied is made higher than the lower-limit frequency of a luminance medium-frequency component signal, and lower than the lower-limit frequency of a luminance high-frequency component signal, and the abstracting of the signals is practiced; thus, it becomes possible that, by suppressing the above-mentioned luminance medium-frequency component signal, mottled granularity is suppressed, by emphasizing the above-mentioned luminance high-frequency component signal, sharpness in fine structure areas such as hairs of a photographic object is enhanced, and by suppressing the above-mentioned color information high-frequency component signal, a noise looking like a color deviation is suppressed.

In an image processing method and apparatus according to the second invention, an emphasis processing is practiced by further abstracting a luminance edge component signal. By doing this, it is possible to eliminate the impression of blur of the shade in the periphery of the bridge of the nose and that around the eyes.

In an image processing method and apparatus according to the third invention, a luminance signal is decomposed into signals of a luminance low-frequency component, a luminance edge component, a luminance medium-frequency component, a luminance high-frequency component, and a luminance superhigh-frequency component. A superhigh-frequency component signal in this invention means a component signal in a superhigh frequency band whose lower-limit frequency is 0.9 times the Nyquist frequency of a set of color image signals representing an original image. A signal in the superhigh frequency band to be obtained from a usual image is very weak, while noises such as a photon shot noise generated in an input device such as a CCD image sensor are present in the superhigh-frequency band; therefore, even if the superhigh-frequency component signal is emphasized, sharpness of the image is not improved, and only a noise looking as if fine powders are scattered over the whole image area is emphasized.

In a conventional technology, when a high-frequency component signal was emphasized in order to improve sharpness of an image, the problem that the above-mentioned noise was emphasized accompanied by the emphasizing of the signal component in the superhigh-frequency band has been produced.

In this invention, a high-frequency component signal is emphasized and a superhigh-frequency component signal is not subjected to any signal transformation or is subjected to a suppression processing. It is desirable that the selection whether not to practice a signal transformation or to practice a suppression processing is made in accordance with the resolution and the state of noises of the set of color image signals representing an original image.

Generally speaking, in the case where the resolution of a set of color image signals representing an original image is low, it is desirable not to apply signal transformation to the superhigh-frequency component signal, because there is a little amount of a signal component resulting from the image even in the frequency band not lower than 0.9 times the Nyquist frequency, and in the case where the resolution of a set of color image signals representing an original image is high and the amount of noises is large, it is desirable to suppress the superhigh-frequency component signal.

By this invention, it has become possible to improve the sharpness of an image without emphasizing a noise looking as if fine powders are scattered over the whole image area.

Further, in the case where the resolution of a set of color image signals representing an original image is low and a noise looking as if fine powders are scattered is noticeable even though the superhigh-frequency component is not emphasized, a method to add a uniform random signal to the superhigh-frequency component signal can be selected. By this operation, the whole image surface is made silky, which can naturally conceal the noises which are originally present.

As described up to now, by this invention, it has become possible to provide an image processing method and apparatus requiring a small amount of calculation work and being capable of suppressing a granular noise signal contained in color image signals, as well as emphasizing the sharpness of an image, while preserving the shade in the periphery of the bridge of the nose and that around the eyes, without producing a noise looking like a color deviation and a smooth blank makeup face, and further, without producing a noise looking as if fine powders are scattered.

Example of Practice

In the following, with reference to the drawings, a concrete example of practice of the embodiment of an image processing method and apparatus of this invention will be explained.

Figure 1:
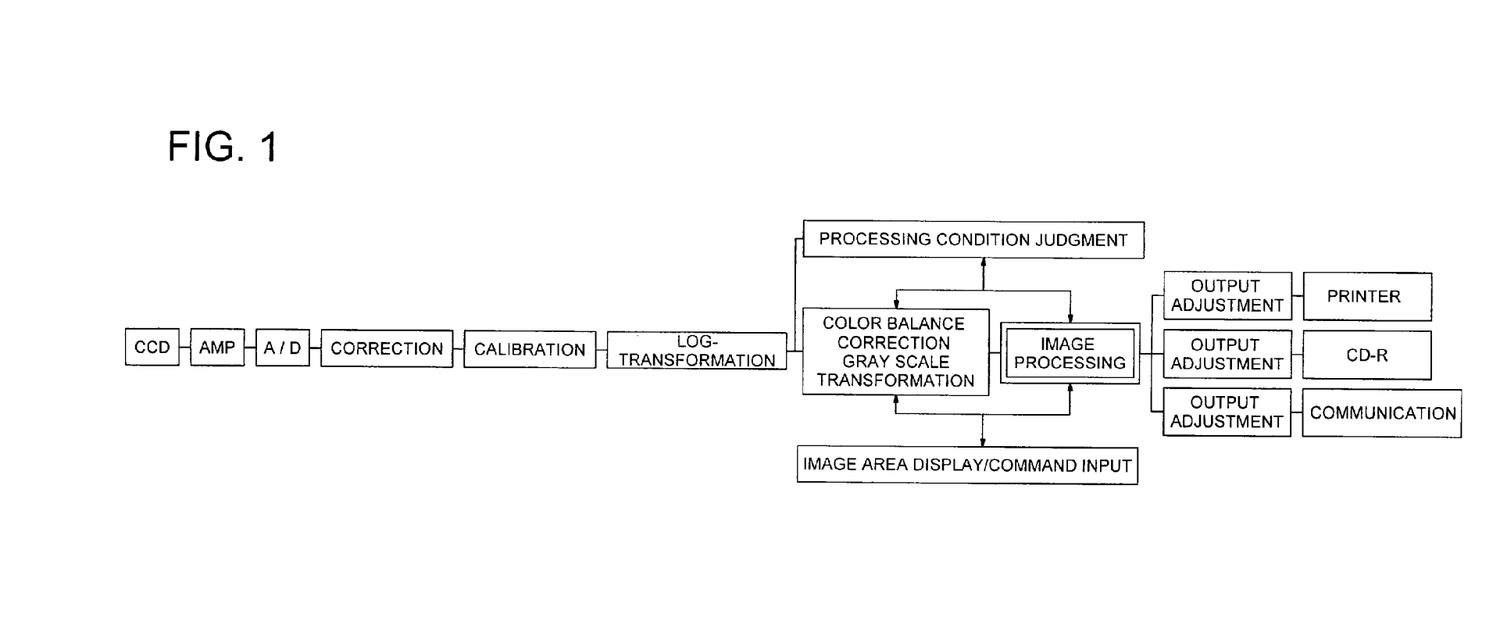

FIG. 1 shows an example of the system blocks of a photographic film reading apparatus provided with an image processing apparatus of this invention built in. The image of a negative film or a reversal film is photoelectrically converted into a set of transmission light quantity signals by a line CCD image sensor or an area CCD image sensor in a film scanning apparatus known to the public. The obtained transmission light quantity signals are amplified by an amplifier, and transformed into digital signals by an A/D converter. Subsequently, corrections to remove noises proper to a light receiving device such as correction of dark fixed-pattern noise and shading correction are carried out, and further, it is practiced a calibration process for correcting the deviations of individual apparatus caused by the dispersion of the characteristic of the optical parts such as a light receiving sensor, a color separation filter, a light source lamp, a lens, and others.

Subsequently, the corrected light transmission quantity signals are transformed into density signals by a logarithmic transformation or the like. These density signals are sent to a processing condition judging section, where the processing conditions for practicing image processing is calculated, and on the basis of these processing conditions, the above-mentioned density signals are transformed into a set of color image signals which have been subjected to color balance correction, gradation correction, and negative to positive reversing. The result of this is displayed on a screen display device, and an operator can practice a reprocessing operation through changing the conditions for the color balance correction, gradation correction, and negative-to-positive reversing as occasion demands. The image signals which have been subjected to the definitely fixed color balance correction, gradation correction, and negative-to-positive reversing are sent to the image processing apparatus of this invention, where they are transformed into a set of processed color image signals on the basis of the conditions instructed by the processing condition judging section and the operator. At this stage, also it is possible according to a display on the screen display device for an operator to instruct reprocessing through changing the processing conditions as occasion demands. The definitely fixed processed image signals are further sent to an output adjusting section corresponding to one of various output apparatus, and after they are subjected to the transformation of color space, adjustment of resolution, reduction or enlargement, compression, data format conversion, etc., they are outputted to a printer, recorded in a medium, or transmitted through a communication line.

Figure 2:
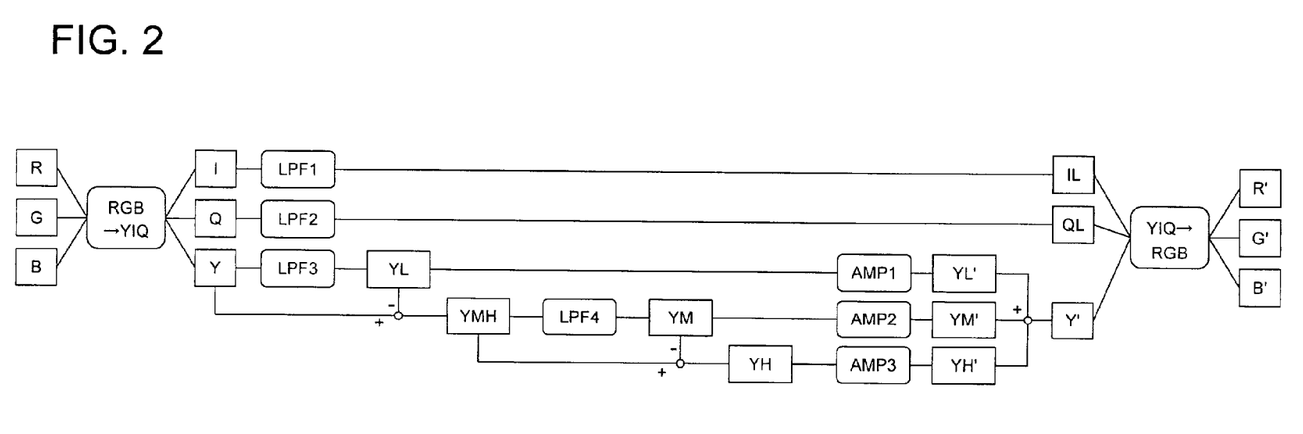
FIG. 2 is a block diagram showing an example of the structure of an image processing apparatus according to the first invention.

FIG. 2 is a block diagram showing an example of the structure of an image processing apparatus according to the first invention.

The inputted R, G, and B signals are transformed into a luminance signal Y and color information signals I and Q. The color information signal I is transformed into a processed color information signal IL with its high-frequency component suppressed by a low-pass filter 1. The color information signal Q is transformed into a processed color information signal QL with its high-frequency component suppressed by a low-pass filter 2. By processing the luminance signal Y by a low-pass filter 3, a luminance low-frequency component signal YL is produced, and by subtracting the luminance low-frequency component signal YL from the luminance signal Y, a luminance signal YMH is generated. The luminance signal YMH is processed by a low-pass filter 4, to generate a luminance medium-frequency component signal YM. Further, by subtracting the luminance medium-frequency component signal YM from the luminance signal YMH, a luminance high frequency component signal YH is generated. The luminance low-frequency component signal YL is processed by an amplifier AMP 1, to be transformed into a processed luminance low-frequency component signal YL'. This processing by the AMP1 is an arbitrary one, and it is also possible to make the processed low-frequency component signal YL' out of the luminance low-frequency component signal YL as it is. In the case where the visual appearance of the final image should be adjusted by making a fine adjustment of the gradation of the image, it is desirable to perform a linear or a non-linear transformation by the AMP1.

The luminance medium-frequency component signal YM is suppressed by an amplifier AMP2, and is transformed into a processed luminance medium-frequency component signal YM'. As regards this signal processing by the AMP2, even such a simple processing as to multiply the inputted signal value YM equally by a coefficient larger than 0 and smaller than 1 has a sufficient effect, but it is desirable a non-linear processing such that the coefficient to multiply is varied in accordance with the magnitude of the inputted signal value YM. In this case, it is desirable to determine the value of the suppression ratio to be low in the case of the small inputted signal value YM, and the value of the suppression ratio to be high in the case of the large inputted signal value YM. Further, also it is possible to practice a control such that, by referring further the value of the luminance low-frequency component signal YL, if the value of the luminance low-frequency component signal YL is small, the suppression ratio of the luminance medium-frequency component signal YM is made high.

The luminance high-frequency component signal YH is emphasized by the AMP3, and is transformed into a processed luminance high-frequency component signal YH'. As regards this signal processing by the AMP3, even such a simple processing as to multiply the inputted signal value YH equally by a coefficient larger than 1 has a sufficient effect, but it is desirable a non-linear processing such that the coefficient to multiply is varied in accordance with the magnitude of the inputted signal value YH. In this case, it is desirable to determine the amplification ratio in the case of a small inputted signal YH value to be low, and the amplification ratio in the case of a large inputted YH value to be high.

By adding together the processed low-frequency component signal YL', the processed medium-frequency component signal YM', and the processed high-frequency component signal YH', which have been calculated in the above-mentioned way, a processed luminance signal Y' is obtained. Further, the set of this processed luminance signal Y', the above-mentioned processed color information signal IL, and the above-mentioned processed color information signal QL are transformed into a set of processed image signals R', G', and B', which are outputted from the image processing apparatus of this invention.

Figure 3:
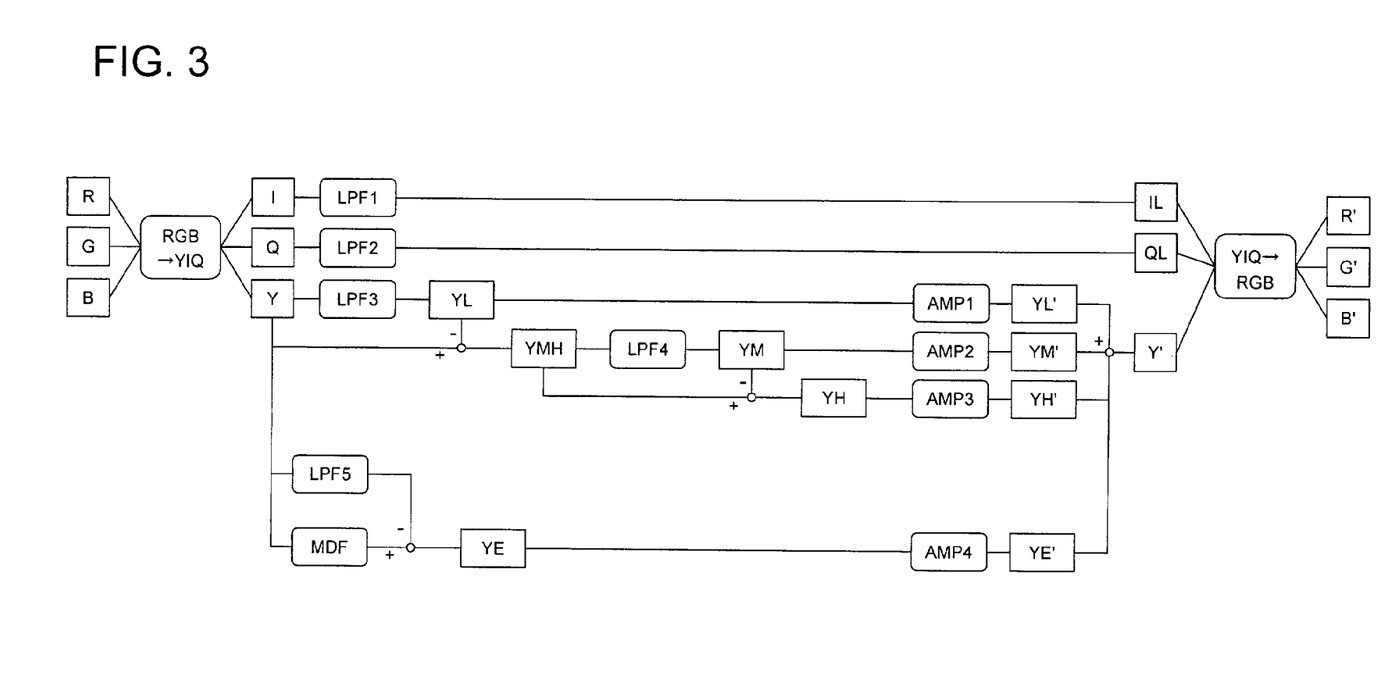
FIG. 3 is a block diagram showing an example of the structure of an image processing apparatus according to the second invention.

FIG. 3 is a block diagram showing an example of the structure of an image processing apparatus according to the second invention. In this structure, the luminance signal Y is separately processed by a low-pass filter 5 and a median filter, and a luminance edge component signal YE is obtained from the difference of the both processed signals. This luminance edge component signal YE is emphasized by an amplifier AMP4, and is transformed into a processed luminance edge component signal YE'. As regards this emphasis processing by the AMP4, even such a simple processing as to multiply the inputted signal value YE equally by a coefficient larger than 1 has a sufficient effect, but it is desirable a non-linear processing such that the coefficient to multiply is varied in accordance with the magnitude of the inputted signal YE value. In this case, it is desirable to determine the amplification ratio in the case of a small inputted signal YE value to be low, and the amplification ratio in the case of a large inputted YE value to be high.

Further, it is more desirable, by linking the above-mentioned processing to the operation of the AMP2 for suppressing the luminance medium-frequency component signal YM, to determine the amplification ratio to be high in the case of a high suppression ratio of the luminance medium-frequency component signal.

The processed luminance edge component signal YE' is added together with the processed low-frequency component signal YL', the processed medium-frequency component signal YM', and the processed high-frequency component signal YH', and a processed luminance signal Y' is obtained.

Further, the set of this processed luminance signal Y', the above-mentioned processed color information signal IL, and the above-mentioned processed color information signal QL are transformed into a set of processed color image signals R', G', and B', which are outputted from the image processing apparatus of this invention.

Figure 4:
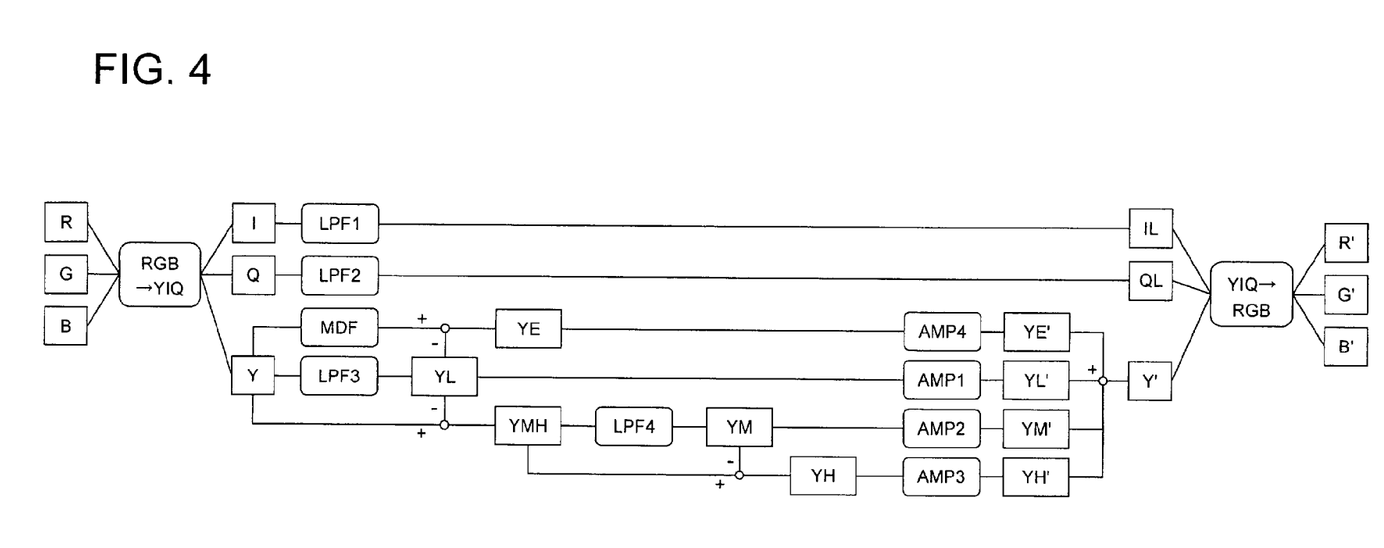
FIG. 4 is a block diagram showing another example of the embodiment of the structure of an image processing apparatus according to the second invention.

FIG. 4 is a block diagram showing another example of the embodiment of the structure of an image processing apparatus according to the second invention. In this structure, because a low-pass filter 3 is commonly used in place of both a low-pass filter to be used for abstracting a luminance low-frequency component signal YL from a luminance signal Y and a low-pass filter for generating a luminance edge component signal YE, the number of times of calculation by a low-pass filter which gives a heavy load, can be reduced.

Figure 5:
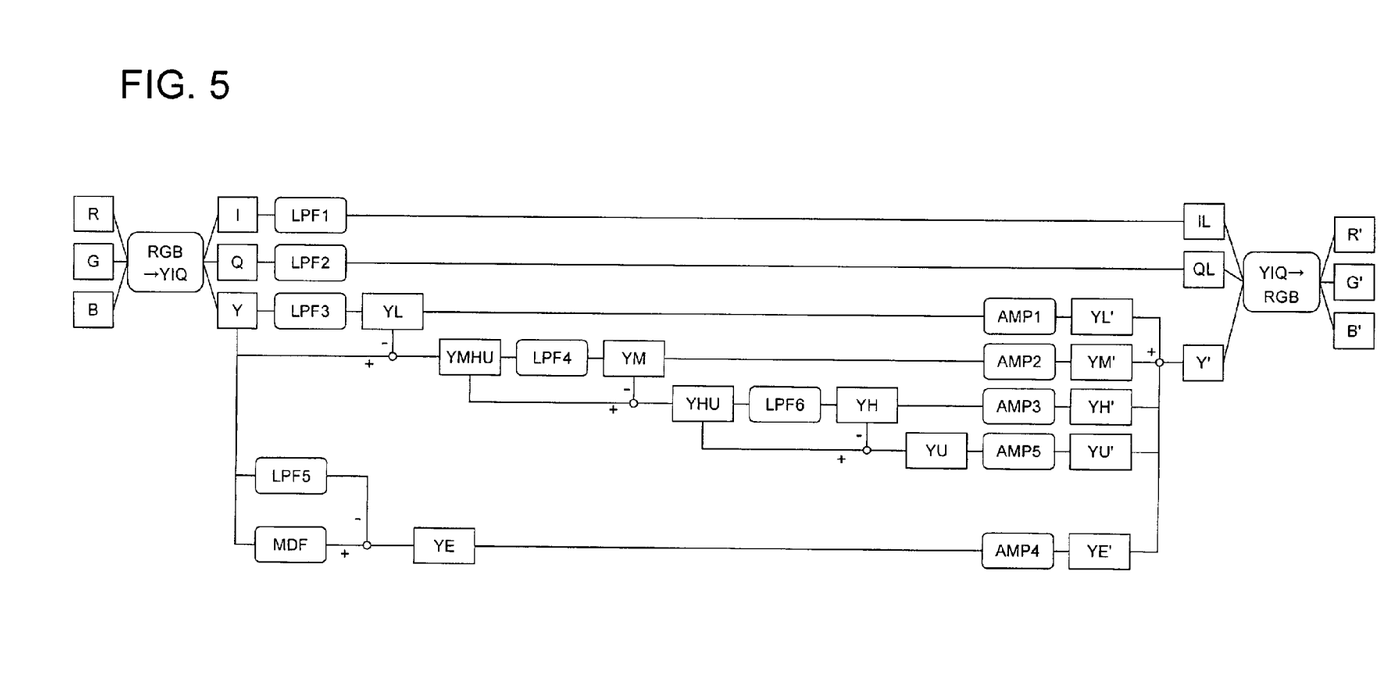
FIG. 5 is a block diagram showing an example of the structure of an image processing apparatus according to the third invention.
Figure 6:
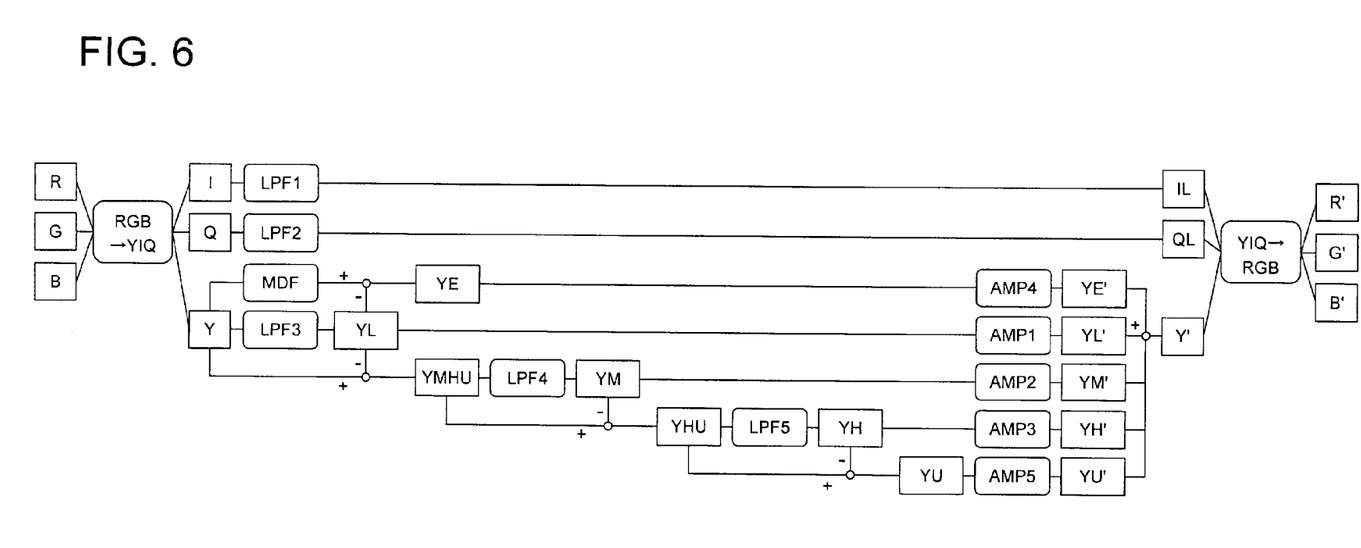
FIG. 6 is a block diagram showing another example of the embodiment of the structure of an image processing apparatus according to the third invention.

FIG. 5 and FIG. 6 are block diagrams each showing an example of the structure of an image processing apparatus according to the third invention. In this structure, a luminance superhigh-frequency component signal YU is separated from a luminance high-frequency component signal YH by a low-pass filter 6.

The luminance high-frequency component signal YH is emphasized by an amplifier AMP3, and is transformed into a processed luminance high-frequency component signal YH'. As regards this signal processing by the AMP3, even such a simple processing as to multiply the inputted signal value YH equally by a coefficient larger than 1 has a sufficient effect, but it is desirable a non-linear processing such that the coefficient to multiply is varied in accordance with the magnitude of the inputted signal YH value. In this case, it is desirable to determine the amplification ratio in the case of a small inputted signal YH value to be low, and the amplification ratio in the case of a large inputted YH value to be high.

The luminance superhigh-frequency component signal YU is processed by an amplifier AMP4, and is transformed into a processed luminance superhigh-frequency component signal YU'. This signal processing by the AMP4 is at least not an emphasis processing, but is an optimum processing selected out of no signal transformation, signal suppression, and a uniform noise addition, which is practiced.

The processed luminance superhigh-frequency component signal YU' having been generated in this way is added together with the processed luminance edge component signal YE', the processed low-frequency component signal YL', the processed medium-frequency component signal YM', and the processed high-frequency component signal YH', and a processed luminance signal Y' is obtained.

Further, the set of this processed luminance signal Y', the above-mentioned processed color information signal IL, and the above-mentioned processed color information signal QL are transformed into a set of processed image signals R', G', and B', which are outputted from the image processing apparatus of this invention.

What is claimed is:

1. An image processing method for obtaining processed color image signals from image signals representing an original image based on a silver halide photosensitive material, comprising:
    transforming a set of color image signals representing the original image based on the silver halide photosensitive material into a luminance signal and color information signals;
    producing processed color information signals by applying a high-frequency component suppression processing to the color information signals;
    decomposing the luminance signal into a luminance low-frequency component signal, a luminance medium-frequency component signal, and a luminance high-frequency component signal;
    making a processed luminance low-frequency component signal by applying a processing, in accordance with requirement, to the luminance low-frequency component signal;
    making a processed luminance medium-frequency component signal by applying a suppression processing to the luminance medium-frequency component signal;
    making a processed luminance high-frequency component signal by applying an emphasis processing to the luminance high-frequency component signal;
    composing a processed luminance signal through combining the processed luminance low-frequency component, the processed luminance medium-frequency component signal, and the processed luminance high-frequency component signal; and
    transforming the processed luminance signal and the processed color information signals into a set of processed color image signals.

2. The image processing method of claim 1, wherein the lower-limit frequency of the high-frequency component suppressing processing, to be applied to the color information signals, is higher than the lower-limit frequency of the luminance medium-frequency component signal, and is lower than the lower-limit frequency of the luminance high-frequency component signal.

3. The image processing method of claim 1, wherein the processing applied, in accordance with requirement, to the luminance low-frequency component signal is a gradation adjustment.

4. An image processing method for obtaining processed color image signals from image signals representing an original image based on a silver halide photosensitive material, comprising:
    transforming a set of color image signals representing the original image based on the silver halide photosensitive material into a luminance signal and color information signals;
    producing processed color information signals by applying a high-frequency component suppression processing to the color information signals;
    decomposing the luminance signal into a luminance low-frequency component signal, a luminance medium-frequency component signal, and a luminance high-frequency component signal;
    abstracting a luminance edge component signal out of the luminance signal;
    making a processed luminance low-frequency component signal by applying a processing in accordance with requirement to the luminance low-frequency component signal;
    making a processed luminance edge component signal by applying an emphasis processing to the luminance edge component signal;
    making a processed luminance medium-frequency component signal by applying a suppression processing to the luminance medium-frequency component signal;
    making a processed luminance high-frequency component signal by applying an emphasis processing to the luminance high-frequency component signal;
    composing a processed luminance signal through combining the processed luminance low-frequency component signal, the processed luminance edge component signal, the processed luminance medium-frequency component signal, and the processed luminance high-frequency component signal; and
    transforming the processed luminance signal and the processed color information signals into a set of processed color image signals.

5. The image processing method of claim 4, wherein the lower-limit frequency of the high-frequency component suppressing processing, to be applied to the color information signals, is higher than the lower-limit frequency of the luminance medium-frequency component signal, and is lower than the lower-limit frequency of the luminance high-frequency component signal.

6. The image processing method of claim 4, wherein the luminance edge component signal is obtained from the difference between a signal obtained by applying a median filter processing to the luminance signal and a signal obtained by applying a low-pass filter processing to the luminance signal.

7. The image processing method of claim 4, wherein the processing applied, in accordance with requirement, to the luminance low-frequency component signal is a gradation adjustment processing.

8. An image processing method for obtaining processed color image signals from image signals representing an original image based on a silver halide photosensitive material, comprising:

transforming a set of color image signals representing the original image based on the silver halide photosensitive material into a luminance signal and color information signals;

producing processed color information signals by applying a high-frequency component suppression processing to the color information signals;

decomposing the luminance signal into a luminance low-frequency component signal, a luminance medium-frequency component signal, a luminance high-frequency component signal, and a luminance superhigh-frequency component signal;

abstracting a luminance edge component signal out of the luminance signal;

making a processed luminance low-frequency component signal by applying a processing, in accordance with requirement, to the luminance low-frequency component signal;

making a processed luminance edge component signal by applying an emphasis processing to the luminance edge component signal;

making a processed luminance medium-frequency component signal by applying a suppression processing to the luminance medium-frequency component signal;

making a processed luminance high-frequency component signal by applying an emphasis processing to the luminance high-frequency component signal;

making a processed luminance superhigh-frequency component signal by applying a processing, in accordance with requirement, to the luminance superhigh-frequency component signal;

composing a processed luminance signal through combining the processed luminance low-frequency component, the processed luminance edge component signal, the processed luminance medium-frequency component signal, and the processed luminance high-frequency component signal, and a processed luminance superhigh-frequency component signal; and transforming the processed luminance signal and the processed color information signals into a set of processed color image signals.

9. The image processing method of claim 8, wherein the lower-limit frequency of the high-frequency component suppressing processing, to be applied to the color information signals, is higher than the lower-limit frequency of the luminance medium-frequency component signal, and is lower than the lower-limit frequency of the luminance high-frequency component signal.

10. The image processing method of claim 8, wherein the processing applied, in accordance with requirement, to the luminance low-frequency component signal is a gradation adjustment processing.

11. The image processing method of claim 8, wherein the processing applied in accordance with requirement to the luminance superhigh-frequency component signal is either a suppression processing or a noise addition processing.

12. The image processing method of claim 8, wherein the luminance edge component signal is obtained from the difference between a signal obtained by applying a median filter processing to the luminance signal and a signal obtained by applying a low-pass filter processing to the luminance signal.

13. An image processing apparatus for obtaining processed color image signals from image signals representing an original image based on a silver halide photosensitive material, comprising:

first signal transforming means to transform a set of color image signals representing the original image based on the silver halide photosensitive material into a luminance signal and color information signals;

first signal suppressing means to produce processed color information signals by applying a high-frequency component suppression processing to the color information signals;

decomposing means to decompose the luminance signal into a luminance low-frequency component signal, a luminance medium-frequency component signal, and a luminance high-frequency component signal;

second signal transforming means to make a processed luminance low-frequency component signal by applying a processing, in accordance with requirement, to the luminance low-frequency component signal;

second signal suppressing means to make a processed luminance medium-frequency component signal by applying a suppression processing to the luminance medium-frequency component signal;

signal emphasizing means to make a processed luminance high-frequency component signal by applying an emphasis processing to the luminance high-frequency component signal;

signal composing means to compose a processed luminance signal through combining the processed luminance low-frequency component, the processed luminance medium-frequency component signal, and the processed luminance high-frequency component signal; and third signal transforming means to transform the processed luminance signal and the processed color information signals into a set of processed color image signals.

14. The image processing apparatus of claim 13, wherein the lower-limit frequency of the high-frequency component suppressing processing, to be applied to the color information signals, is higher than the lower-limit frequency of the luminance medium-frequency component signal, and is lower than the lower-limit frequency of the luminance high-frequency component signal.

15. The image processing apparatus of claim 13, wherein the second signal transforming means applied, in accordance with requirement, to the luminance low-frequency component signal is a gradation adjustment processing means.

16. An image processing apparatus for obtaining processed color image signals from image signals representing an original image based on a silver halide photosensitive material, comprising:

first signal transforming means to transform a set of color image signals representing the original image based on the silver halide photosensitive material into a luminance signal and color information signals;

first signal suppressing means to produce processed color information signals by applying a high-frequency component suppression processing to the color information signals;

decomposing means to decompose the luminance signal into a luminance low-frequency component signal, a luminance medium-frequency component signal, and a luminance high-frequency component signal;

abstracting means to abstract a luminance edge component signal out of the luminance signal;

second signal transforming means to make a processed luminance low-frequency component signal by applying a processing, in accordance with requirement, to the luminance low-frequency component signal;

first signal emphasizing means to make a processed luminance edge component signal by applying an emphasis processing to the luminance edge component signal;

second signal suppressing means to make a processed luminance medium-frequency component signal by applying a suppression processing to the luminance medium-frequency component signal;

second signal emphasizing means to make a processed luminance high-frequency component signal by applying an emphasis processing to the luminance high-frequency component signal;

signal composing means to compose a processed luminance signal through combining the processed luminance low-frequency component signal, the processed luminance edge component signal, the processed luminance medium-frequency component signal, and the processed luminance high-frequency component signal; and third signal transforming means to transform the processed luminance signal and the processed color information signals into a set of processed color image signals.

17. The image processing apparatus of claim 16, wherein the lower-limit frequency of the high-frequency component suppressing processing, to be applied to the color information signals, is higher than the lower-limit frequency of the luminance medium-frequency component signal, and is lower than the lower-limit frequency of the luminance high-frequency component signal.

18. The image processing apparatus of claim 16, wherein the abstracting means abstracts the luminance edge component signal from the difference between a signal obtained by applying a median filter processing to the luminance signal and a signal obtained by applying a low-pass filter processing to the luminance signal.

19. The image processing apparatus of claim 16, wherein the second signal transforming means applied, in accordance with requirement, to the luminance low-frequency component signal is a gradation adjustment processing means.

20. An image processing apparatus for obtaining processed color image signals from image signals representing an original image based on a silver halide photosensitive material, comprising:

first signal transforming means to transform a set of color image signals representing the original image based on the silver halide photosensitive material into a luminance signal and color information signals;

first signal suppressing means to produce processed color information signals by applying a high-frequency component suppression processing to the color information signals;

decomposing means to decompose the luminance signal into a luminance low-frequency component signal, a luminance medium-frequency component signal, a luminance high-frequency component signal, and a luminance superhigh-frequency component signal;

abstracting means to abstract a luminance edge component signal out of the luminance signal;

second signal transforming means to make a processed luminance low-frequency component signal by applying a processing, in accordance with requirement, to the luminance low-frequency component signal;

first signal emphasizing means to make a processed luminance edge component signal by applying an emphasis processing to the luminance edge component signal;

second signal suppressing means to make a processed luminance medium-frequency component signal by applying a suppression processing to the luminance medium-frequency component signal;

second signal emphasizing means to make a processed luminance high-frequency component signal by applying an emphasis processing to the luminance high-frequency component signal;

third signal transforming means to make a processed luminance superhigh-frequency component signal by applying a processing, in accordance with requirement, to the luminance superhigh-frequency component signal;

signal composing means to compose a processed luminance signal through combining the processed luminance low-frequency component signal, the processed luminance edge component signal, the processed luminance medium-frequency component signal, and the processed luminance high-frequency component signal, and a processed luminance superhigh-frequency component signal; and fourth signal transforming means to transform the processed luminance signal and the processed color information signals into a set of processed color image signals.

21. The image processing apparatus of claim 20, wherein the lower-limit frequency of the high-frequency component suppressing processing, to be applied to the color information signals, is higher than the lower-limit frequency of the luminance medium-frequency component signal, and is lower than the lower-limit frequency of the luminance high-frequency component signal.

22. The image processing apparatus of claim 20, wherein the second signal transforming means applied, in accordance with requirement, to the luminance low-frequency component signal is a gradation adjustment processing means.

23. The image processing apparatus of claim 20, wherein the third signal transforming means to be applied to the aforesaid luminance superhigh-frequency component signal, in accordance with requirement, is either a suppression means or a noise addition means.

24. The image processing apparatus of claim 20, wherein the abstracting means abstracts the luminance edge component signal from the difference between a signal obtained by applying a median filter processing to the luminance signal and a signal obtained by applying a low-pass filter processing to the luminance signal.

* * * * *